United States Patent [19]

Beckenhauer

[11] Patent Number: 5,681,385
[45] Date of Patent: Oct. 28, 1997

[54] METHOD FOR RETARDING EFFLORESCENCE IN BUILDING MATERIALS AND BUILDING MATERIAL THAT EXHIBITS REDUCED EFFLORESCENCE

[76] Inventor: Thomas Beckenhauer, 2325 SW. 338th St., Federal Way, Wash. 98023

[21] Appl. No.: 633,696

[22] Filed: Apr. 18, 1996

[51] Int. Cl.[6] .......................... C04B 24/02; C04B 41/46
[52] U.S. Cl. .................. 106/724; 106/802; 106/823; 106/287.26; 106/2; 427/309; 427/384; 427/421; 427/443.2; 524/4; 524/650; 428/688
[58] Field of Search ...................... 106/724, 802, 106/287.23, 287.26, 819, 823, 2; 427/309, 421, 430.1, 443.2, 384; 428/688; 524/4, 5, 650

[56] References Cited

U.S. PATENT DOCUMENTS

| | | | |
|---|---|---|---|
| 2,576,955 | 12/1951 | Ludwig | 524/5 |
| 3,645,763 | 2/1972 | Ronzio et al. | 524/4 |
| 4,434,193 | 2/1984 | Beckenhauer | 427/299 |

OTHER PUBLICATIONS

Product Brochure describing Airvol polyvinylalcohol from Air Products; Air Products and Chemicals, Inc., Allentown, PA, 1993 (no month).

Product Brochure, "Polymer Product for Adhesives," Air Products and Chemicals, Inc., Allentown, PA, 1995 (no month).

*Primary Examiner*—Michael Marcheschi
*Attorney, Agent, or Firm*—Seed and Berry LLP

[57] ABSTRACT

Efflorescence of building material, such as portland cement based building products, masonry, brick, concrete, and mortar, can be retarded by contacting the building material with polyvinylalcohol (PVOH). The PVOH may be dissolved in solvent, preferably water, and either applied to a surface of the building material, or added to the components that form the building material. The PVOH has a hydrolysis percentage above about 90%.

16 Claims, No Drawings

METHOD FOR RETARDING EFFLORESCENCE IN BUILDING MATERIALS AND BUILDING MATERIAL THAT EXHIBITS REDUCED EFFLORESCENCE

TECHNICAL FIELD

The present invention relates to a method for retarding efflorescence in building materials such as portland cement based building products, masonry, brick, concrete, mortar, and the like, and more particularly, relates to coating or incorporating polyvinylalcohol onto or into building materials to thereby retard efflorescence.

BACKGROUND OF THE INVENTION

Many building materials, and particularly those that are comprised largely of inorganic building materials such as masonry, cement, brick and the like, are naturally porous and allow penetration and migration of water. Inorganic building material is comprised of earthen materials that contain naturally occurring salts and other compounds (hereafter collectively "salts") that efflorescence. In some instances, inorganic building material receives additional salt from the ground to which it is exposed, or from contact with other neighboring materials. When salts within inorganic building material contact atmospheric moisture or moisture from other sources, the salts and moisture form an aqueous salt solution. This aqueous salt solution can migrate throughout the inorganic building material by capillary action, in a process called capillarity. Additional salts may dissolve in the aqueous salt solution during its migration.

When the aqueous salt solution stops migrating, which can occur, for example, at the surface of the inorganic building material, the water can evaporate and leave behind the salts. These salts, when on the surface of the inorganic building material, typically give the material's surface a white coloration, which is one example of efflorescence. When inorganic building material is treated with a water-repellent substance, an interface is formed at the deepest point of penetration of the water repellent. When the migrating salt solution reaches this interface, water evaporates and the salts are deposited that can form efflorescence inside the inorganic building material, just underneath the water repellent.

Surface efflorescence is extremely unsightly. This aesthetic detriment can monetarily devalue afflicted masonry. When efflorescence occurs underneath a water-repellent coating, salt crystals expand as they grow and can cause extreme pressures that can result in the spalling and flaking of the inorganic building material. This process can compromise the structural integrity of the building material. Thus, efflorescence causes monetary losses through aesthetic devaluation, and through the materials and labor necessary to replace the afflicted building material.

Several approaches to retarding efflorescence have been described. One general approach is to eliminate moisture from inorganic building material. Thus, specific architectural designs may be selected that channel water away from the building material. Alternatively, moisture elimination is attempted by preventive measures such as flashing and caulking, and by construction practices such as covering the building material during its construction. These practices have provided only moderate reduction in the incidence of efflorescence.

Hydrophobic additives have been incorporated into inorganic building material in an attempt to reduce moisture penetration. While it is possible to gain some desirable water repellency characteristics with these integral hydrophobic additives, the process is self-limiting for two reasons. First, when the inorganic building material is concrete, the concrete needs water to hydrate the cement in order to cure the concrete. Too much hydrophobic material in the wet concrete inhibits this hydration. Second, as the degree of hydrophobicity of the concrete increases, the degree of suction and bonding decreases. For example, a concrete block produced with an integral hydrophobic material will repel the water in the mortar that is intended to bind the block and mortar together. Addition of hydrophobic materials to mortar increases the problem. Moisture in the concrete block is repelled by the hydrophobic material in the mortar, giving the net effect of the mortar not properly bonding to the block. Additionally, integral hydrophobic materials reduce the mortar's strength. Integral hydrophobic materials only moderately reduce moisture penetration, and this benefit comes with diminishing concrete product strength, suction, and bonding.

While hydrophobic water-repellent coatings can help to reduce surface efflorescence, this benefit comes sometimes at the cost of having salts deposited underneath the point where the water-repellent coating has penetrated the inorganic building material. The ensuing salt crystal growth and resultant spalling may be more troublesome than the surface efflorescence that would have resulted had the surface not been coated with a hydrophobic material. The Brick Institute of America technical Notes #7 states: "Water-repellent surface treatments . . . decrease efflorescence by causing the dissolved salts to be deposited beneath the treated surface. However, the application of [a hydrophobic coating]to a masonry wall that has the tendency to efflorescence, without reducing the mechanisms for the occurrence of that efflorescence may lead to surface spalling or flaking of masonry units."

Elimination of water-soluble salts has been attempted in order to reduce efflorescence. This has been extremely difficult to accomplish. Efflorescence salts are generally chemically inert, and efforts to alter their chemical structure in order to eliminate them has been difficult. Attempts to preclude water-soluble salts from the materials used to form the inorganic building materials has also been extremely difficult to accomplish. Water-soluble salts are inherent to the earthen materials used to form inorganic building materials.

Prior techniques have attempted to eliminate capillary action from occurring within inorganic building materials, and thus eliminate migration of the aqueous salt solutions that causes efflorescence. However, because of the natural porosity of inorganic building material, there is an inherent tendency for capillary action to occur. Capillary action has been stopped when the surface pores of inorganic building material are completely filled with continuous films that form a physical barrier that block the passage of air, water, and water vapor. These films may be made of hydrophobic materials, or materials which neither repel nor attract water. These films trap air within the capillaries, so that any movement of moisture produces an increase or decrease in the pressure of the air. Capillary forces are not generally strong enough to overcome these changes in air pressure.

The process disclosed in U.S. Pat. 4,434,193 to Beckenhauer, "Method for Retarding Masonry Efflorescence," achieves moderate success in retarding efflorescence. The Beckenhauer patent discloses adding specific glycols to inorganic building material compositions. However, the glycols disclosed by that patent are either completely miscible with water, or are extremely water-soluble, which has made them very impractical for exterior use. Precipitation (e.g., rain) simply washes these glycols away, thus ending their effective utility.

Accordingly, there is thus a need in the art for building materials that do not show the effects of efflorescence, and for methods to retard efflorescence in building materials. The present invention solves these long-standing needs, and provides other related advantages, as discussed below.

SUMMARY OF THE INVENTION

The present invention is directed to a method for retarding efflorescence of a building material that is subject to efflorescence staining. The method includes the step of applying a coating composition comprising polyvinylalcohol (PVOH) onto a surface of the building material subject to efflorescence, where the PVOH has a hydrolysis percent of at least about 90%.

In another embodiment of the invention, a method of retarding efflorescence of a building material is provided wherein a composition comprising polyvinylalcohol (PVOH) is mixed with components that are needed to form the building material. Again, the PVOH has a hydrolysis percent of at least about 90%, and it is mixed with the components in an amount effective to retard efflorescence in or on the building material.

Another aspect of the invention is an article of manufacture comprising a building material subject to efflorescence and PVOH, where the PVOH has a hydrolysis percent of at least about 90% and is present in the article at an amount effective to retard efflorescence of the building material.

These and other aspects of the invention will become evident upon reference to the following detailed description.

DETAILED DESCRIPTION OF THE INVENTION

The present invention provides articles of manufacture useful in building or constructing structures that are resistant to efflorescence, and provides a method of imparting efflorescence-resistance to a building material that would otherwise be susceptible to efflorescence.

The building material which is suitably employed in the invention is any material that can exhibit, or is subject to efflorescence. Brick, cement, concrete, mortar, plaster and stucco are non-limiting examples of such building materials. Building materials which are mainly inorganic are a suitable class of building materials for use in the invention. Preferred mainly inorganic building materials are formed in whole or in part from portland cement, including normal portland cement, modified portland cement, high-early-strength portland cement, low-heat portland cement, sulfate-resisting portland cement, air-entrained portland cements, portland blast-furnace slag cements, white portland cement, portland-pozzolana cement, redi-mix concrete, precast concrete, architectural concrete, concrete paving, prestressed concrete and masonry based on portland cement.

Another preferred group of building materials subject to efflorescence are common masonry materials such as brick (including adobe, clay, reinforced clay, clay tile and clay pavers), stone (including granite, limestone and river rock), concrete block (including architectural building block, prefaced or glazed block, common building block and concrete products) and mortar (such as lime mortar and lime-and-portland cement mortar).

Cementitious materials such as inorganic hydraulic cement, portland cement, masonry cement, waterproofed cement, pozzolana cement, alumina cement, synthetic calcium aluminate cement, expanded concrete, concrete, concrete block, slump block, concrete pavers, concrete roofing tiles, precast concrete, poured-in-place concrete, tilt-up concrete, ready-mixed concrete, architectural concrete, structural concrete, glass fiber reinforced concrete, exposed aggregate, grout, plaster, stucco, joint cement and natural cement are another category of building material that may be used in the invention.

Plaster and stucco are exemplary building materials of the invention, where Keene's cement, gypsum plaster, cement plaster are representative examples. The building material includes brick and other fired clay-based products such as ceramic, tile and terra-cotta.

The building material of the invention will typically be formed in whole or part of inorganic material, because many inorganic building materials are subject to efflorescence. The building material may be formed from a composite or blend of organic material and inorganic material, or entirely from organic material, as long as the building material is subject to efflorescence. For example, some clays as obtained or mined from the earth contain organic components such as coal, and are suited for treatment according to the invention.

In order to impart efflorescence-resistance to building material subject to efflorescence, it has been discovered that the building material should be contacted with polyvinylalcohol (PVOH). PVOH is available commercially from a number of suppliers, where Air Products (Allentown, Pa.) is a representative supplier of PVOH. PVOH is a white to cream granular powder, having a bulk density of about 40 lbs./cu. ft and a Tg (°C.) of about 75–85. PVOH is typically prepared by hydrolyzing polyvinylacetate, where polyvinylacetate is typically prepared by homopolymerization of vinyl acetate. PVOH is typically characterized in terms of its hydrolysis percent, where hydrolysis percent reflects the percentage of the acetate groups of the polyvinylacetate which were hydrolyzed in order to form the PVOH. The PVOH useful in the invention has at least 90% hydrolysis, preferably has at least about 95% hydrolysis, and more preferably has about 95% to 99.9% hydrolysis, according to values provided by the manufacturer.

The PVOH useful in the invention may also be characterized in terms of its molecular weight. The number average molecular weight of the PVOH useful in the invention is at least about 5,000, preferably about 7,000 to about 500,000. PVOH having a relatively high number average molecular weight, on the order of about 15,000 to about 300,000, preferably about 44,000 to about 200,000, and more preferably about 70,000 to about 100,000 is preferred for longevity of the efflorescence retarding ability of the coating. The weight average molecular weight of the PVOH is at least about 5,000, is preferably about 13,000 to about 500,000 and is more preferably about 13,000 to about 190,000.

The PVOH is preferably dissolved in water before being combined with the building material, although it could be dissolved in non-aqueous solvents as well. Techniques to dissolve PVOH in water are known in the art, and are described in the Examples herein. As a general procedure, the PVOH is gradually added to cold or room temperature water, using sufficient agitation to wet out all particles with water and form a dispersion. The surface of the water should be moving vigorously during the PVOH addition. According to a preferred embodiment of the invention, the PVOH will not dissolve in this cold or room temperature water, and the dispersion must be heated to obtain a solution. The heating temperature is generally at least about 50° C., and is preferably in the range of about 80° C.–100° C.(ca. 180° F.–212° F.), and upon being maintained within this temperature range for about 30 minutes, the dispersion of PVOH in water will form an aqueous solution of PVOH. The aqueous solution of PVOH may be cooled back to room temperature, and will remain as a solution. Alternatively, an aqueous solution of PVOH may be prepared by jet cooking.

The PVOH solution contains about 0.001%–50% by weight PVOH, preferably about 0.01%–30% by weight PVOH in an aqueous solution. In general, the upper limit to the PVOH concentration in water is determined only by the viscosity of the resulting aqueous solution. As the content of PVOH increases, the solution becomes more viscous and less easy to handle, and at above about 50% by weight, PVOH solutions are very viscous and difficult to work with.

The precise PVOH content of a PVOH solution useful according to the invention will depend on the exact identity of the PVOH. A lower molecular weight PVOH can generally be formed into a higher solids solution. However, a low solids solution may be readily used in the present invention, although repeated coatings of such a low solids solution onto a surface of a building material may be necessary to achieve the desired efflorescence-retarding effect.

The desired concentration of PVOH in a solution may be influenced by the surface of the building material that is being coated. For example, where the surface is formed from lightweight concrete block, which is highly absorbent and will require a relatively large amount of PVOH coating to remain free of efflorescence, an approximately 12% PVOH solution is conveniently used. However, where the surface is very dense, the coating may contain only about 2% PVOH. Higher or lower concentrations may be used, depending on the preference of the user.

The PVOH solution may contain ingredients other than PVOH and solvent. For example, where the PVOH solution will be stored for more than a day or two, it is preferred to include a biocide in the solution. One or more of a surface active agent, defoamer and crosslinker may also be added to the solution. Some examples of additives are as follows: Biocides such as KATHON® Lx Biocide (Rohm & Haas, Philadelphia, Pa.) at <50 ppm and DOWICIL® 75 biocide from Dow Chemical (Midland, Mich.) at 100–200 ppm; Surface active agents such as SURFYNOL® 465 Surfactant (Air Products. Allentown, Pa.) at about ¼% d/d and SURFYNOL® 440 Surfactant (Air Products) at about ¼% d/d; Defoamers such as FOAMASTER® V defoamer (Henkel) at <1% d/d, FOAMASTER® KB defoamer (Henkel) at <1% d/d, DREWPLUS® L474 defoamer (Drew Industrial, Division of Ashland Chemical Co.) <1% d/d, SURFYNOL® 61 defoamer (Air Products) at about 0.9% by weight of aqueous, and SURFYNOL® DF,-75 (Air Products) at about 0.2% by weight of aqueous; and Crosslinkers such as SUNREZ® 700 Crosslinker (Sequa) at 1–4% d/d, BACOTE® -20 (Magnesium Elektron, Ltd.) at 2–10% d/d and GLYOXAL® Crosslinker (American Hoechst) at 5–15% d/d The PVOH coating may be applied to a surface of a building material, or it may be incorporated into the building material during the manufacture thereof. The building material to which the PVOH is applied may be uncured (has not yet hardened, e.g., a concrete surface which has not totally hardened) or it may be cured. Alternatively, the PVOH may be used as a component to form the building material, which is subsequently cast and cured. The PVOH coating may be applied to the building material over a wide range of temperatures, including sub-freezing temperatures (less than 32° F.) and high temperatures (greater than 100° F.).

The coating of PVOH may be cast or applied to a dry or wet surface by rolling, brushing, spraying, rolling, pouring, dipping and backrolling, etc. The coating may be applied by transfer pump at about two to three gallons/minute from a container to the surface of the building material, followed by rolling or brushing as with standard waterproofing pats. A densely filled, soft-fibered brush is preferably used to make sure that the PVOH solution evenly but liberally penetrates all surfaces of the building material.

The amount of PVOH desirably applied to the surface of a building material should be sufficient to achieve a retardation of efflorescence, i.e., an effective amount of PVOH should be applied to the building material surface. The precise amount will vary depending on the ambient temperature, and on the concentration and viscosity of the PVOH solution, as well as the nature, particularly the porosity, of the surface. A surface with high porosity, such as concrete block, will require more PVOH per surface square foot than will a less porous, less absorbent surface such as dense fired clay. As a rough rule of thumb, where the PVOH is applied as an aqueous solution having a concentration of about 0.001% to about 50% (percentages are by weight based on total weight of PVOH and water in the composition), the coverage rate will be about 1 to about 1,000 square feet of the surface per gallon of the coating, preferably about 10 to about 500 square feet/gallon, and more preferably about 40 to about 200 square feet/gallon. When using a solution having about 7% PVOH, about 40–200 square feet per gallon, preferably about 100–150 square feet/gallon of coating is applied to the surface, depending on the surface porosity.

After being coated with the PVOH solution, the surface of the building material should be allowed to dry, preferably for at least about 4 hours, in the absence of precipitation. When applied in extreme cold temperatures or under high humidity conditions, it will take longer for the PVOH coating to dry than is the case under high temperature, low humidity conditions. Drying time will also increase with increased coating thickness.

The surface of the building material is preferably clean and free from efflorescence before being coated with the PVOH solution of the invention. Methods to clean efflorescence from the surface of a building material are well known in the art. The surface may be slightly moistened prior to being coated with the PVOH solution, however is preferably dry to the touch when being coated with the PVOH solution. It is preferred to maximize the extent to which the PVOH solution penetrates the building material. Penetration may be assisted by lowering the viscosity of the solution. Viscosity may be lowered by reducing the molecular weight of the PVOH. Penetration may also be enhanced by the addition of a surface active agent to the PVOH solution. External variables can also enhance penetration. This includes temporarily (15 minutes or less) heating the building material to a temperature of up to about 300° F., or heating the building material for an extended period of time at a temperature not exceeding about 212° F. Alternatively, or in addition, the PVOH solution may be heated while it is being applied to the building material. Heating the PVOH solution reduces its viscosity, and this can increase penetration.

Furthermore, the present invention relates to a method for retarding efflorescence of a building material, wherein a composition comprising polyvinylalcohol (PVOH) is mixed with components needed to form the building material. The PVOH has a hydrolysis percent of at least about 90% and is mixed into the building material components at a concentration effective to retard efflorescence. According to this method, the PVOH is an integral component of the building material.

According to this embodiment of the invention, PVOH is preferably dissolved in solvent, and more preferably dissolved in water as described above, and the PVOH solution is added to the components that form the building material. For example, where the building material is cement, the PVOH solution can be added along with the water that is used to form the pre-cast concrete slurry. The PVOH should be present in the building material in an amount effective to retard efflorescence of the building material, and should have a hydrolysis percent of at least about 90%.

An effective amount of PVOH to retard efflorescence in a building material is generally about 0.001% to about 50% by weight based on the total weight of PVOH and building material. Preferably, about 0.01% to about 10%, and more preferably about 0.05% to about 5% of PVOH is incorporated into the building material.

Because PVOH rapidly decomposes above about 200° C., it should not be contacted with the building material at any point before which the building material will be exposed to 200° C. For example, the PVOH is preferably not incorporated into brick before the brick is fired. When PVOH is contacted with brick according to the invention, the PVOH is preferably applied to the brick after the brick has been cured. The PVOH solution can be added to the wet phase of cementitious materials, preferably as a replacement for some of the water that is used to form the wet phase cementitious material.

According to the aforedescribed methods, an article of manufacture is provided which contains building material subject to efflorescence and polyvinylalcohol (PVOH). The article of manufacture may be a block or other form useful in building and constructing various structures, e.g., walls, roofs, fireplaces, etc. The article of manufacture may be building material coated with PVOH, or it may be building material wherein the PVOH is an integral component of the building material.

The following theory is offered to explain the efficacy of PVOH in retarding efflorescence in building material. The primary facet of efflorescence manifestation that is affected by the inventive method is the movement of liquid water within building material. Efflorescence is controlled by severely restricting or eliminating the movement of water within these materials. The invention reduces the amount of liquid water which moves within building material. Stationary water cannot cause migration of water-soluble salts. Likewise, water vapor does not dissolve water-soluble salts and therefore cannot cause migration of these salts.

The restriction or elimination of water movement is achieved according to the invention by adding to the building material a PVOH that can hydrogen bond to water. PVOH is comprised of long, straight chains of carbon, having hydroxyl groups appended thereto. The structure of PVOH may be abbreviated as $(—CH_2—CHOH—)_n$ and thus it can be seen that hydroxyl groups are present on alternating carbon atoms of the straight carbon chain of PVOH. PVOH thus has a high density of hydroxyl groups.

It is believed that when PVOH is present in or on building material, the hydroxyl groups of PVOH hydrogen bond to water that is in the material. This water may be either condensed water or isolated water molecules. Water molecules are thus hydrogen-bonded to the PVOH, and may hydrogen bond to other water molecules. In this way, condensed water may be hydrogen bonded, directly or indirectly, to PVOH. Water that is hydrogen bonded to PVOH will have a reduced tendency to migrate through the building material, and thus has a reduced tendency to transport salts and contribute to efflorescence.

In addition, contacting building material with PVOH may speed up the drying of a building material, thus reducing the availability of condensed water to transport salts. This is because water that is present in the building material can either hydrogen bond with itself or with the PVOH. Water is more weakly hydrogen bonded to PVOH than it is hydrogen bonded to itself, therefore water that is hydrogen bonded to PVOH evaporates more quickly than water that is hydrogen bonded to other water molecules. The result is that when PVOH is present in or on the building material, water evaporates faster from the building material than if the PVOH was not present. Building material contacting PVOH effectively dries out faster than building material lacking PVOH contact. The presence of PVOH retards efflorescence by removing two of the three causes of efflorescence, namely available moisture and capillarity of residual moisture.

The following specific examples serve to further illustrate the invention. These examples are merely illustrative of the invention are not to be construed as a limitation thereof.

EXAMPLE 1

TREATMENT OF RED EFFLORESCENCE-PRONE BRICK 40 grams of Airvol™ 165 was blended with 1,960 grams of water at about 60° F. AIRVOL® 165 PVOH is a super hydrolyzed (99.3+% hydrolyzed), 124,000–186,000 weight average molecular weight PVOH marketed by Air Products and Chemicals, Inc., Allentown, Pa. The blend was placed in a plastic container that was placed inside a metal container filled with boiling water. The blend was heated and stirred for a period of about 30 minutes. The resultant aqueous solution was 2% by weight PVOH. The PVOH solution was then applied to a 1"×1"×2.5" segment of a red efflorescence-prone brick by immersing one-half of one end of the segment into the PVOH solution for a period of about 20 seconds. The application resulted in a coverage rate of about 100 square feet per gallon. The treated brick segment was allowed to dry for about 12 hours at normal laboratory temperatures and humidity.

An aqueous solution of 25% by weight NaCl was prepared by dissolving 150 grams of NaCl into 450 grams of $H_2O$. The treated brick segment and an untreated segment (the same size segment and brick type) were placed on end (untreated end down in the case of the treated brick segment) into a 1" deep bath of the NaCl solution for a period of about five days in order to simulate conditions likely to promote efflorescence. The untreated brick segment and the untreated half of the treated brick segment began to show efflorescence after about the first 12 hours, while the treated brick and treated half showed none.

EXAMPLE 2

TREATMENT OF CONCRETE BLOCK

An aqueous PVOH solution was prepared according to the procedure of Example 1, but at a concentration of 7% by weight PVOH. The PVOH was a 50%/50% blend by weight of AIRVOL® 107 PVOH and AIRVOL® 321 PVOH The solution also contained 0.9% Surfynol™ 61 Surfactant from Air Products and Chemicals, Inc., Allentown, Pa. The aqueous PVOH solution was applied to porous concrete block segments that had a water absorption rate of about 13% by weight of the block material. One half of one end of the concrete block segment, measuring approximately 2.5"×2"× 2", was immersed in the 7% PVOH solution for a period of about 45 seconds, and then allowed to dry overnight in ambient laboratory air. A 25% by weight solution of NaCl was prepared and the treated block segment and a control block segment were placed on end (untreated end down in the case of the treated block segment) to a depth of about one inch to simulate efflorescing conditions. After a period of about four days the control block segment exhibited a considerable amount of efflorescence while the treated portion of the treated block segment remained extremely resistant to efflorescence.

EXAMPLE 3

TREATMENT OF DENSE CONCRETE PAVER CUBES

A 6% aqueous solution of PVOH was prepared for use on dense concrete paver cubes that measured about 2"×2"×2". The PVOH was a 50%/50% blend by weight of AIRVOL® 107 PVOH and AIRVOL® 321 PVOH. The sample was immersed for about 30 seconds in this solution bottom surface down to within about ¼" of the top of the cube. The cube was allowed to dry in laboratory air for about 12 hours. Again a 25% by weight solution of NaCl was prepared and the treated cube and a control cube were immersed treated (bottom) surface down into the salt bath. The immersion/ efflorescence simulation test was allowed to proceed for about four days at which point extensive efflorescence could be observed on the control cube while the treated cube showed little or no efflorescence.

EXAMPLE 4

COMPARATIVE EXAMPLE

Two 7% by weight aqueous solution of PVOH were prepared, where the first solution was prepared from 87.0%–89.0% hydrolyzed PVOH and the second solution was prepared from 98.0%–98.8% hydrolyzed PVOH (both from Air Products, Allentown, Pa.). Three red efflorescence-prone brick sections measuring approximately 1"×1"×1¼" were treated with these solutions as follows. One brick was treated with the first solution, another brick was treated with the second solution, and a third brick was untreated and served as the control. The bricks being treated were immersed in the indicated PVOH solution for thirty seconds, so that all of the brick except the top ⅜" of the brick was contacted with PVOH solution. The treated sections were then allowed to dry.

The three brick sections were then sprayed with approximately 60° F. water from a spray nozzle for a period of about 15 minutes in order to simulate a rain shower.

Then the untreated ends of the treated brick sections and one end of the control brick section were submerged to the extent of 3/16" into a 25% by weight aqueous solution of NaCl to simulate efflorescing conditions. Within a few minutes the saline solution wicked via capillarity to the PVOH immersion line of the treated brick sections. The control brick section exhibited the same rate of capillarity. Once the saline solution reached the PVOH immersion line of the brick section treated with the 98.0%–98.8% hydrolyzed PVOH, capillarity stopped. The control brick section and the brick section treated with the 87.0%–89.0% hydrolyzed PVOH showed little if any impedance of the capillarity of the saline. Capillarity and efflorescing of the control and 87.0%–89.0% hydrolyzed PVOH treated brick sections continued while the brick section treated with 98.0%–98.8% hydrolyzed PVOH remained virtually unchanged.

These results indicate that bricks coated with PVOH having 87.0%–89.0% hydrolysis will not have the resistance to efflorescence that can be obtained when bricks are coated with 98.0%–98.8% hydrolyzed PVOH according to the invention. Furthermore, the longevity and the practicability of the coating made with 98.0%–98.8% PVOH is much greater than that obtained with 87.0%–89.0% PVOH.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A method for retarding efflorescence of a building material, comprising the step of applying a coating composition comprising polyvinylalcohol (PVOH) onto a surface of a building material subject to efflorescence, said PVOH having a hydrolysis percent of at least about 90%.

2. The method of claim 1 wherein the building material comprises brick, cement, concrete, mortar, plaster or stucco.

3. The method of claim 1 wherein the surface of the building material is cured prior to being coated with the PVOH.

4. The method of claim 1 wherein the surface of the building material is uncured when coated with the PVOH.

5. The method of claim 1 wherein said hydrolysis percent is at least about 95%.

6. The method of claim I wherein said hydrolysis percent is about 95% to about 99.9%.

7. The method of claim 1 wherein said PVOH has a number average molecular weight of about 5,000 to about 500,000.

8. The method of claim 1 wherein said coating composition comprises PVOH dissolved in water.

9. The method of claim 8 wherein the PVOH will not dissolve in water at ambient outdoor temperatures.

10. The method of claim 9 wherein the PVOH requires a temperature of at least about 50° C. to dissolve in water.

11. The method of claim 9 wherein the PVOH dissolves in water at a temperature of about 80° C. to about 100° C.

12. The method of claim 8 wherein said composition has a PVOH concentration of about 0.001% to about 50% by weight, based on the total weight of the PVOH and water in the composition.

13. The method of claim 8 wherein said composition has a PVOH concentration of about 0.01% to about 30% by weight, based on the total weight of the PVOH and water in the composition.

14. The method of claim 11 wherein said composition is applied to the surface at a coating amount of about 1 to about 1000 square feet of surface/gallon of composition.

15. The method of claim 14 wherein the coating amount is about 40 to about 200 square feet of surface/gallon of composition.

16. An article of manufacture comprising a building material coated with polyvinylalcohol (PVOH), said building material containing salts which can effloresce, said PVOH having a hydrolysis percent of at least about 90% and being present in said composition at an amount effective to retard efflorescence of the building material.

* * * * *